United States Patent [19]
Ohtani et al.

[11] Patent Number: 5,690,830
[45] Date of Patent: Nov. 25, 1997

[54] WASTE WATER TREATMENT APPARATUS AND WASHING METHOD THEREOF

[75] Inventors: Akira Ohtani; Kenichi Inoue; Naoki Tada; Toshiyuki Kawashima, all of Osaka, Japan

[73] Assignee: Nitto Denko Corporation, Osaka, Japan

[21] Appl. No.: 668,719

[22] Filed: Jun. 24, 1996

Related U.S. Application Data

[63] Continuation of Ser. No. 294,042, Aug. 24, 1994, abandoned.

[30] Foreign Application Priority Data

Aug. 26, 1993 [JP] Japan .............................. HEI.5-211536
Jan. 27, 1994 [JP] Japan .............................. HEI.6-007445

[51] Int. Cl.[6] .................... B01D 61/00; B01D 24/00; C02F 1/44
[52] U.S. Cl. .................... 210/636; 210/650; 210/195.2; 210/257.2; 210/321.69; 210/333.01; 210/799; 210/134; 210/106
[58] Field of Search ...................... 210/636, 691, 210/650, 195.1, 257.1, 333.01, 333.1, 799, 652, 257.2, 134, 97, 106, 321.69

[56] References Cited

U.S. PATENT DOCUMENTS

| | | | |
|---|---|---|---|
| 4,366,063 | 12/1982 | O'Connor | 210/652 |
| 4,931,186 | 6/1990 | Ford et al. | 210/636 |
| 4,935,143 | 6/1990 | Kopp et al. | 210/636 |
| 5,227,071 | 7/1993 | Torline et al. | 210/651 |
| 5,342,863 | 8/1994 | Buckley et al. | 210/257.2 |

FOREIGN PATENT DOCUMENTS

| | | | |
|---|---|---|---|
| 035038 | 9/1978 | Japan . | |
| 55-49887 | 12/1980 | Japan . | |
| 1-104309 | 4/1989 | Japan | 210/321.69 |

OTHER PUBLICATIONS

Derwent Abstract S61129094 (Jun. 17, 1986).
Derwent Abstract J56024006 (Mar. 7, 1981).

*Primary Examiner*—Ana Fortuna
*Attorney, Agent, or Firm*—Sughrue, Mion, Zinn, Macpeak & Seas, PLLC

[57] ABSTRACT

A waste water treatment apparatus which can discharge cleaned waste water while separating and recovering insoluble granular components such as emulsions contained in various kinds of waste waters and various kinds of industrial waste waters, while minimizing the decrease of permeation flux by an effective separation membrane washing, and a washing method of the apparatus are disclosed. In washing the separation membrane, a passageway for water permeated through the separation membrane is intercepted, and a compressed gas is introduced into at least a waste feeding side of the separation membrane for a predetermined time, thereby flowing a gas liquid mixed liquid.

15 Claims, 3 Drawing Sheets

WASTE WATER TREATMENT APPARATUS AND WASHING METHOD THEREOF

This is a continuation of application Ser. No. 08/294,042, filed Aug. 24, 1994, now abandoned.

FIELD OF THE INVENTION

The present invention relates a waste water treatment apparatus which can discharge clean waste·water while separating and recovering insoluble granular components such as emulsions, fine particles, fungi, etc., contained in various washed waste waters, various industrial waste waters, etc., and to a washing method for the apparatus.

BACKGROUND OF THE INVENTION

Components existing in the form of an emulsion, fine particles, etc., in various insoluble components in waste water usually have a wide range of the particle size distribution, and it is difficult to separate and remove these components by a dead-end filtration operation with a coarse mesh, such as filter papers or filters. Even if these components can be separated well, the permeation performance of the separation membrane is decreased due to the increase of the permeation resistance caused by the deposition of insoluble components, and the treating efficiency of a liquid is decreased, which are the fatal defects in dead-end filtration mechanism.

It is well known that a membrane separating operation such as a microfiltration membrane, an ultrafiltration membrane, a low-pressure operating loose reverse osmosis membrane, etc., is suitable for the separation technique, and a fact has been widely recognized that the deposition rate of insoluble components can be greatly decreased by conducting the membrane separating operation in a cross flow operation. However, the phenomenon in a permeating direction is fundamentally the same as the conventional filtering phenomenon, and thus, the permeation resistance is increased with the elapsed time and it becomes difficult to keep a sufficient permeating rate.

Hitherto, various washing methods are proposed as a method to overcome the problem, and a part thereof has been practically used. These washing methods are generally classified into a chemical washing process and a physical washing process. The chemical washing process is a washing process which removes insoluble components deposited on the membrane by flowing a specific detergent, but this process has a problem that the process is limited to the use only to which the specific detergent is applicable. The physical washing process is a process which removes substances deposited on the membrane surface by a mechanical stress. Examples of the physical washing process include a washing process by increasing the flow rate at the waste water-feeding side, a washing method of applying a reverse pressure of permeated water from the permeated side, a gas back washing method of applying a gas pressure from the permeated side, a washing method of applying a shock vibration or an ultrasonic vibration from the outside portion of the separation membrane, etc.

However, as to these physical washing methods each has the respective problem. For example, the washing method by increasing the flow rate at the water-feeding side, the washing method of applying a reverse pressure of permeated water from the permeated side, and the gas back washing method of applying a gas pressure from the permeated side have an operation limit in the membrane itself or the module structure of the separation membrane on the durability, and it frequently happens that a desired washing effect is not always obtained. Further, the washing method of applying the reverse pressure of permeated water and the gas back washing method are effective for a separation membrane having a relatively coarse pore size, such as a microfiltration membrane, but are not so effective for a separation membrane having a fine pore size, such as an ultrafiltration membrane and a reverse osmosis membrane.

The method of removing deposited substances by an external vibration also involves a problem on the mechanical durability and a limit on the removal performance caused by the problem similar to the cases described above.

Further, the use of a high-speed gas-liquid mixed fluid by employing a gas-liquid mixer is proposed to increase the washing effect, as described in JP-B-55-49887 (the term "JP-B" as used herein means an "examined published Japanese patent application"). This technique shows an excellent effect to a tubular membrane separation apparatus, but in washing by other type of washing apparatus such as a flat-sheet membrane stack type separation apparatus, a spiral-wound membrane separation apparatus, or a hollow fiber membrane separation apparatus, it is required to previously collect careful data in order to determine the optimum washing operation process or a combination of the washing processes for obtaining a sufficient washing effect, and as the case may be, much time is required for the collection of the data. Furthermore, a washing apparatus is an collateral equipment of a waste water treatment apparatus, and if the waste water treatment apparatus is complicated, the apparatus cost and the operation cost are increased, which result in lacking in the practical use.

SUMMARY OF THE INVENTION

The present invention has been made to overcome the problems of the conventional techniques described above.

One object of the present invention is to provide a waste water treatment apparatus which can discharge cleaned waste water while separating and recovering insoluble granular components such as emulsions, fine particles, fungi, etc., contained in various kinds of waste waters and various kinds of industrial waste waters.

Another object of the present invention is to provide a washing process of the apparatus.

As a result of various investigations to attain the above objects, it has been found that in washing a separation membrane, by intercepting the passageway for water permeated through the separation membranes and flowing a gas-liquid mixed fluid to at least the water feeding side of the separation membrane, the separation membrane of the waste water treatment apparatus for treating waste water containing insoluble granular components such as emulsions, fine particles, fungi, etc., can be washed with a good efficiency. The present invention has been attained based on this finding.

According to one embodiment of the present invention, there is provided a waste water treatment apparatus for separating and removing insoluble granular components in a solid, liquid or gaseous state from a waste water containing the insoluble granular components with a separation membrane, which comprises a means for intercepting a passageway for water permeated through the separation membrane in washing the separation membrane, an inlet for introducing a compressed gas into at least the waste water feeding side, and a means for intercepting the introduction of the compressed gas in treating the waste water treatment, which is disposed in a conduit connecting the inlet to a source for the compressed gas, wherein in washing the separation membrane, the means for intercepting the passageway for water permeated through the separation membrane intercepts the permeated water passageway, the means for intercepting the introduction of the compressed gas is opened, and the compressed gas is introduced to flow a gas-liquid mixed fluid to thereby wash the separation membrane.

It is the preferred embodiment in the apparatus of the present invention that an inlet for introducing the compressed gas is disposed at both the waste water supplying side of the separation membrane and the permeated water passageway at the side of the separation membrane ahead of the means for intercepting the passageway for water permeated through the separation membrane.

It is more preferred embodiment in the apparatus of the present invention that the change of the amount of the permeated water is detected by a flowmeter and/or a pressure gage disposed in the passageway of the permeated water and at the same time, the time for introducing the compressed gas is controlled according to the detected value, whereby the time for washing the separation membrane by flowing the gas-liquid mixed fluid is controlled.

According to another embodiment of the present invention, there is provided a washing method of a waste water treatment apparatus for separating and removing insoluble granular components in a solid, liquid, or gaseous state by a separation membrane, which comprises in washing the separation membrane, intercepting the passageway for water permeated through the separation membrane and introducing a compressed gas into the waste water feeding side of the separation membrane for a predetermined time to flow a gas-liquid mixed fluid.

It is the preferred embodiment in the washing method of the present invention that the compressed gas is introduced to both the waste water feeding side of the separation membrane and the water permeated side thereof for a predetermined time to flow the gas-liquid mixed fluid.

It is more preferred embodiment in the washing method of the present invention that the change of the flow rate of the water permeated through the separation membrane is detected by a flowmeter and/or a pressure gage and the time for introducing the compressed gas is controlled according the detected value, whereby the time for washing by flowing the gas-liquid mixed fluid is controlled.

DETAILED DESCRIPTION OF THE INVENTION

The present invention is described in detail below by reference to the following examples.

Figure 1:
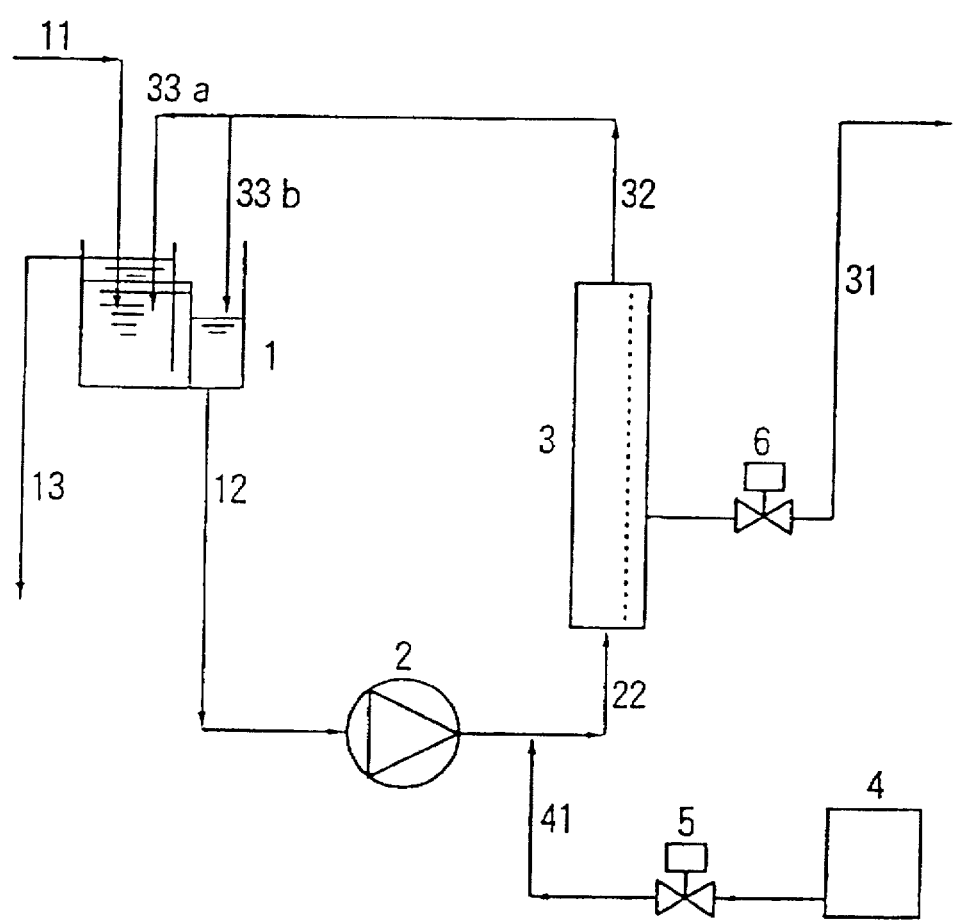
FIG. 1 is a schematic view showing one example of the waste water treatment apparatus used in the present invention.

FIG. 1 is a schematic view showing one example of the waste water treatment apparatus used in the present invention. In the apparatus shown in FIG. 1, various kinds of washed waste waters or various kinds of industrial waste waters each containing insoluble granular components from a factory, etc., are sent through a waste water line 11. The various kinds of waste waters sent through the waste water line 11 are subjected to a phase separation by the specific gravity difference in a liquid-liquid separation tank and a non-aqueous phase containing insoluble components is then discharged from the apparatus through a discharging line 13. An aqueous phase separated in the decanter 1 is sucked in a liquid-sending pump 2 through a pump suction line 12 and pressurized in the pump 2. The aqueous phase pressurized in the pump 2 is sent to a separation membrane 3 through a passageway 22 for feeding waste water to the separation membrane 3 and insoluble components are removed with the separation membrane 3. The permeated water from which the insoluble components were removed with the separation membrane is sent to a permeated water passageway 31 and condensed water containing the condensed insoluble components is sent to a condensed water passageway 32. The condensed water sent to the condensed water passageway 32 is sent back to the decanter 1. Part of the condensed water is sent to the liquid-liquid separation tank through a condensed water return line 33a, and then subjected to a liquid-liquid separation again. The remaining condensed water is sent to the aqueous phase side in the decanter through a condensed water recycling line 33b, pressurized in the liquid sending pump 2, and sent to the separation membrane 3. Thus, the stationary waste water treatment operation is continued.

However, when the stationary operation is continued, the insoluble components are deposited on the membrane surface of the separation membrane 3 to decrease the permeating rate of the separation membrane. To recover the decreased permeation rate, pressurized air compressed in a compressor 4 is introduced into the passageway 22 for supplying the waste water to the separation membrane 3 through a compressed gas line 41. In addition, according to the kind of the liquid to be treated, a nitrogen gas, a carbonic acid gas, oxygen-enriched air, etc., is used as the compressed gas. When a nitrogen gas or a carbonic acid gas is used, the compressed gas is, as the case may be, supplied from a gas cylinder. An automatic valve 5 disposed in the compressed air line 41 is opened when the compressed gas is introduced. When the compressed air is introduced, the aqueous phase passing through the passageway 22 is sent to the separation membrane 3 as a mixture with the compressed air to wash away the permeation rate-decreasing insoluble components deposited on the surface of the separation membrane, and then sent to the decanter 1 as a mixed fluid of the condensed water, air, and the deposited materials through the condensed water passageway 32. At the introduction of the compressed air, the automatic valve 6 equipped to the passageway 31 of permeated water is closed simultaneously with the introduction of the compressed air in connection with the automatic valve 5 for introducing the compressed air to accelerate the recovery of the decreased permeation rate, that is, to accelerate the washing effect and shorten the washing time. The automatic valve 6 is opened after a predetermined time. While the automatic valve 6 of the passageway 31 of permeated water is closed, it is necessary that the time for closing the automatic valve 6 is selected by considering the material balance of the whole waste water treating system in order to prevent the flow out of permeated water.

Figure 2:
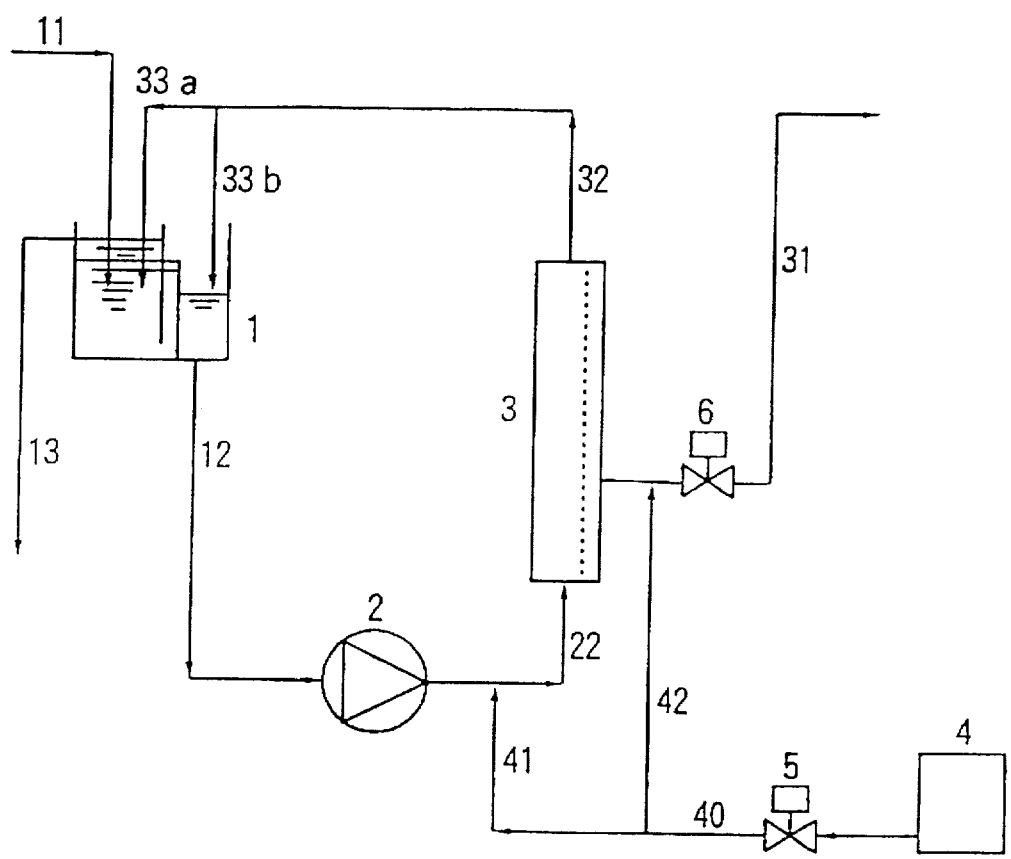
FIG. 2 is a schematic view showing another example of the waste water treatment apparatus used in the present invention.

FIG. 2 is a schematic view showing another example of the waste water treatment apparatus used in the present invention.

As described above, when the stationary operation is continued, insoluble components are deposited on the membrane surface of the separation membrane 3 to decrease the permeation rate of the separation membrane. To recover the decreased permeation rate, pressurized air compressed in a compressor 4 is introduced into the separation membrane side of an automatic valve 6 equipped to the passageway 31 of permeated water of the separation membrane through compressed air lines 40 and 42 and the compressed air is similarly introduced into a passageway 22 of waste water to the separation membrane through compressed air lines 40 and 41. In addition, according to the kind of waste water to be treated, a nitrogen gas, a carbonic acid gas, an oxygen-enriched air, etc., is suitably selected and used as the compressed air. When a nitrogen gas or a carbonic acid gas is used, the compressed gas is, as the case may be, supplied from a gas cylinder.

During the introduction of the compressed air, the aqueous phase passing through the passageway 22 for feeding waste water to the separation membrane is sent to the separation membrane as a mixture with the compressed air to wash away the permeation rate-decreasing insoluble components accumulated on the surface of the separation membrane and is then sent to the decanter 1 as a mixed fluid of the condensed water and the air through the condensed water passageway 32. At the introduction of the compressed air, the automatic valve 6 equipped to the permeated water passageway 31 is closed simultaneously with the introduction of the compressed air in connection with the automatic valve 5 for introducing the compressed air. In this case, the compressed air introduced to the permeated side of the separation membrane 3 through the compressed air lines 40 and 42 pushes back the permeated liquid in the conduit to the direction opposite the permeating direction and pushes out the insoluble granular components clogged in the fine pores of the separation membrane in the waste water feeding side, which accelerates the washing effect and shortens the washing time.

The automatic valve 6 at the permeated water passageway side is opened after a predetermined time but since permeated water does not flow out while the automatic valve 6 is closed, it is necessary that the time for closing the automatic valve 6 is selected considering the material balance of the whole waste water treatment system.

Figure 3:
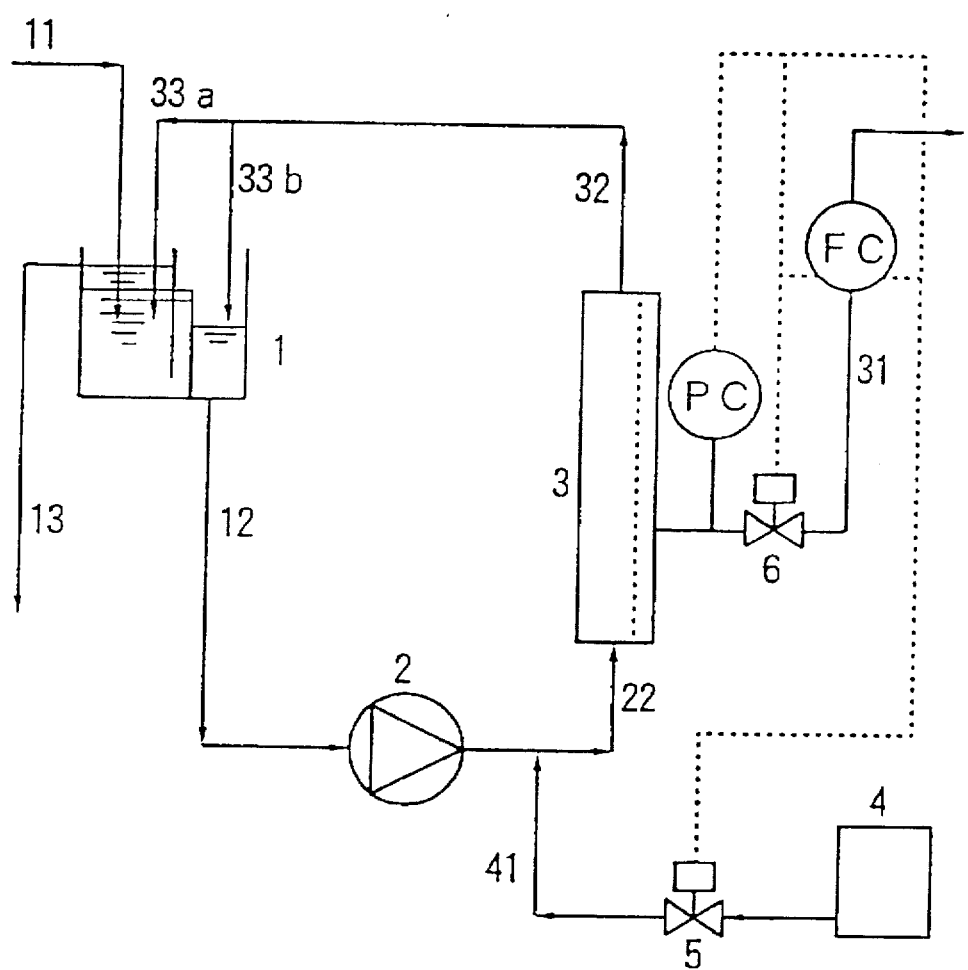
FIG. 3 is a schematic view showing an example of the waste water treatment apparatus having incorporated therein a permeation rate recovery system controlling mechanism used in the present invention.

FIG. 3 is a schematic view showing an example of the waste water treatment apparatus of the present invention in the case of automatically controlling the operation of the apparatus shown in FIG. 1, wherein PC is a pressure controller of permeated water and FC is a flow rate controller of permeated water. In the system shown in FIG. 3, the change of the permeating rate of the separation membrane is detected by the permeated water pressure controller PC and/or the permeated water flow rate controller FC and when the detected value of the permeated water pressure controller PC becomes lower than a predetermined value (or the detected value of the permeated water flow rate controller FC becomes lower than a predetermined value), the automatic valve 5 is automatically opened and the automatic valve 6 is automatically closed.

The operation of the apparatus shown in FIG. 2 can also be automatically controlled by using the similar system.

There is no particular restriction on the instruments and equipments used in the present invention so long as they have a resistance to waste water to be treated and can be operated with a good efficiency, but to avoid intermixing of impurities into waste water during the treatment, a dry type compressor is suitable as the compressor and pump made of a stainless steel is suitable as the liquid sending pump.

The separation membrane used is a membrane capable of selectively separating the insoluble components in the waste water. For example, a polyolefin ultrafiltration membrane (NTU-2120 and NTU-204S, trade names, made by NITTO DENKO CORPORATION) is suitable, and a fluorine microfiltration membrane (NTF-5200, made by NITTO DENKO CORPORATION) is suitable for use in separating polymeric dyestuff and fungi.

There is no particular restriction on the module type system of the separation membrane used in the present invention, and various modules such as a spiral-wound type, a hollow fiber type, a plate & frame type, etc., can be selectively used.

EXAMPLE 1

In FIG. 1, when waste water to be treated was a washed waste water in the case of using a detergent, AXAREL 32 (trade name, made by DU PONT-MITSUI FLUORO-CHEMICALS COMPANY, LTD), the concentration of AXAREL 32 was 500 ppm (temperature 60° C., pressure 1 atm), one ultrafiltration membrane spiral-wound type module, NTU-2120-S4 (membrane area=4 $m^2$/one-module) was used as the separation membrane module 3, a multi-stage type centrifugal pump of 0.75 KW was used as the liquid sending pump 2, a volume-type dry compressor of 0.4 KW was used as the compressor 4, and one 2-tank type square tank was used as the decanter 1, the flow rate of waste water to be treated was 100 liters/hour, the liquid-sending amount to the separation membrane was about 2,000 liters/hour, and the liquid-sending pressure was 2.0 $Kg/cm^2G$. The amount of permeated water was about 100 liters/hour and TOC (total organic carbon) in the permeated water was 200 ppm or less. Emulsion was not contained in the permeated water.

In the washing operation, the pressure of compressed air was 2.5 $Kg/cm^2G$, the introducing rate of the compressed air was 5.0 NL/minute, and one washing operation was conducted for one minute per the waste water treatment of 29 minutes. The working times of the automatic valves 5 and 6 were the same as the introducing time of the compressed air.

When the waste water treatment was conducted for 100 hours while applying washing of the present invention according to the above operation, the decrease in the permeation rate was only 1%. That is, after operating the waste water treatment for 100 hours, the waste water treatment could be conducted at the permeation rate of 99% of the initial permeation rate. The total amount of the permeated water in the operation for 100 hours was 9,600 liters.

COMPARATIVE EXAMPLE 1

When the waste water treatment as in Example 1 was conducted without applying the washing operation of the present invention, the permeation rage after the operation became 50% of the initial permeation rate. In this case, the total amount of the permeated water in the operation for 100 hours was 6,700 liters.

COMPARATIVE EXAMPLE 2

In the waste water treatment in Example 1, the washing operation of the present invention was not applied, a washing method of introducing compressed air to the waste water supplying side without intercepting the stream of the permeated water line was applied with the same time schedule as in Example 1, and the water treatment was conducted for 100 hours. As a result, the permeation rate after the operation was 90% of the initial permeation rate. The total amount of the permeated water in the operation for 100 hours was 9,400 liters.

EXAMPLE 2

In place of the control system of the washing step in Example 1, the system was employed that when the detected value of the permeated water flow rate controller FC shown in FIG. 3 became lower than 99 liters/hour during the waste water treatment operation, the waste water treatment operation was automatically switched to the washing operation and after one minute since then, the operation was returned to the waste water treatment operation. In addition, the working times of the automatic valves 5 and 6 were the same as the introducing time of the compressed air as in Example 1, that is, one minute. When the waste water treatment was conducted for 100 hours under the same conditions as in Example 1 except for the control system in the washing step, the decrease in the permeation rate was only 1%. That is, after the operation of 100 hours, the waste water treatment could be conducted at the permeation rate of 99% of the initial permeation rate. The total amount of the permeated water after the operation for 100 hours was 9,800 liters.

EXAMPLE 3

In FIG. 2, when waste water to be treated was a washed waste water using a detergent, Chlorocut C-411 (trade name, made by Kurita Water Industries, Ltd.), the concentration of Chlorocut C-411 was 150 ppm (temperature 60° C., pressure 1 atm), one ultrafiltration membrane spiral-wound type module, NTU-204S-S4 (old trade name: NTU-2120-S4) (trade name, made by NITTO DENKO CORPORATION) (membrane area=4 m$^2$/one-module) was used as the separation membrane 3, a multi-stage centrifugal pump of 0.75 KW was used as the liquid-sending pump 2, a volume type dry compressor of 0.4 KW was used as the compressor 4, and one 2-tank type square tank was used as the decanter 1, the flow rate of waste water to be treated was 100 liters/hour, the liquid-sending amount to the separation membrane was 2,000 liters/hour, and the liquid-sending pressure was 2.0 Kg/cm$^2$G. The flow rate of the permeated water was about 100 liters/hour and TOC in the permeated water was 30 ppm or less. Emulsion was not contained in the permeated water.

In the washing operation, the pressure of the compressed air was 2.5 Kg/cm$^2$G, the introducing rate of the compressed air was 5.0 NL/minute, and the washing operation was applied once for one minute per the waste water treatment of 15 minutes. The working times of the automatic valves 5 and 6 were the same as the introducing time of the compressed air.

By applying the washing operation of the present invention according to the above manner, the waste water treatment could be conducted with the permeation rate of 60% of the initial permeation speed after the operation of 100 hours. The total amount of the permeated water in the operation for 100 hours was 6,700 liters.

EXAMPLE 4

In Example 3, a washing method was applied wherein the stream of the passageway of permeated water was intercepted but the compressed air was not introduced into the permeated side of the separation membrane 3 and introduced into the waste water supplying side only, and the waste water treatment was employed with the same time schedule as in Example 3 and conducted for 100 hours. As a result, the permeation rate after the operation was 40% of the initial permeation rate. The total amount of the permeated water in the operation for 100 hours was 5,200 liters.

COMPARATIVE EXAMPLE 3

When the waste water treatment as in Example 3 was conducted for 100 hours without applying the washing operation, the permeation rate became 15% of the initial permeation rate. The total amount of the permeated water in the operation for 100 hours was 2,800 liters.

Since the waste water treatment apparatus and the washing method thereof of the present invention have the constitution as described above and can efficiently wash the separation membrane of the waste water treating apparatus, insoluble components such as emulsions, fine particles, fungi, etc., contained in various kinds of washed waste waters and various kinds of industrial waste waters can be efficiently separated and such a waste water can be discharged as clean water. Further, since the washing time is short, the membrane area of the separation membrane and the waste water treating apparatus can be small-sized.

While the invention has been described in detail and with reference to specific embodiments thereof, it will be apparent to one skilled in the art that various changes and modifications can be made therein without departing from the spirit and scope thereof.

What is claimed is:

1. A waste water treatment apparatus for separating and removing insoluble, granular material from waste water, comprising:

a separation membrane having a feed side and a permeate side, wherein said separation membrane has a spiral-wound module structure;

a waste water inlet in fluid communication with said feed side of said separation membrane for introducing said waste water to said separation membrane;

a permeated water outlet in fluid communication with said permeate side of said separation membrane for receiving permeated water from said separation membrane, said permeated water outlet including a first valve in said permeated water outlet located downstream from said separation membrane operable between an open position where water flows out of said apparatus and a closed position for recycling said waste water from said separation membrane to said waste water inlet;

means for introducing compressed gas into said waste water inlet to form a mixture of gas and liquid in said waste water inlet for removing said insoluble, granular material deposited on said separation membrane from said separation membrane, said compressed gas introduction means comprising:

a gas source; and a second valve operable between an open position for introducing said compressed gas into said waste water inlet and a closed position, said second valve being located between said gas source and said waste water inlet means, and said second valve being in said open position for introducing said compressed gas into said waste water inlet when said first valve is in a closed position and for recycling said waste water and said insoluble, granular material removed from said separation membrane to said waste water inlet; and a recycle means for recycling said waste water and said insoluble, granular material and said separation membrane is washed with said mixture of gas and liquid.

2. The waste water treatment apparatus of claim 1, further comprising means in fluid communication with said gas source for introducing said compressed gas into said permeated water outlet to form a mixture of gas and liquid in said permeated water outlet for further removal of said deposited granular material from said separation membrane by forcing said liquid in said permeated water outlet through said separation membrane from said permeate side to said feed side.

3. The waste water treatment apparatus of claim 2, further comprising a detector for detecting a change in the flow rate of water flowing through said water outlet, and a controller for selectively opening and closing both of said first valve and said second valve in response to a change in said flow rate through said water outlet.

4. The waste water treatment apparatus of claim 3, wherein said detector is a flowmeter and/or a pressure gauge located in said water outlet.

5. The waste water treatment apparatus of claim 2, further comprising a liquid-liquid separation tank in fluid communication with said waste water inlet for separating a non-aqueous phase from said waste water prior to separating and removing said insoluble granular material from said waste water.

6. The waste water treatment apparatus of claim 1, further comprising a detector for detecting a change in the flow rate of water flowing through said permeated water outlet, and a controller for selectively opening and closing both of said first valve and said second valve in response to said change in said flow rate through said permeated water outlet.

7. The waste water treatment apparatus of claim 6, wherein said detector is a flowmeter and/or a pressure gauge located in said water outlet.

8. The waste water treatment apparatus of claim 1, further comprising a liquid-liquid separation tank in fluid communication with said waste water inlet for separating a non-aqueous phase from said waste water prior to separating and removing said insoluble granular material from said waste water.

9. A waste water treatment apparatus according to claim 1, wherein the compressed gas introduction means introduces gas to the permeate side as well as to the feed side of the separation membrane.

10. A waste water treatment apparatus according to claim 9, further comprising a detector for detecting a change in the flow rate of water flowing through said waste water inlet, and a controller for selectively opening and closing both of said first valve and said second valve in response to said change in said flow rate through said waste water inlet.

11. The waste water treatment apparatus of claim 10, wherein said detector is a flowmeter and/or a pressure gauge located in said water outlet.

12. The waste water treatment apparatus of claim 9, further comprising a liquid-liquid separation tank in fluid communication with said waste water inlet for separating a non-aqueous phase form said waste water prior to separating and removing said insoluble granular material from said waste water.

13. A method for removing deposited, insoluble granular material from a separation membrane having a spiral-wound module structure of a waste water treatment apparatus, comprising the steps of:

passing waste water to a feed side of said membrane treatment apparatus to produce a permeate and retentate;

interrupting the flow of permeate through a permeate water outlet of said treatment apparatus, and introducing a compressed gas into a waste water inlet of said separation membrane to form a mixture of gas and liquid in said water inlet;

flowing said mixture of gas and liquid into contact with said separation membrane to remove said deposited, insoluble, granular material from said separation membrane; and recycling said waste water and insoluble granular material removed from said separation back to said separation membrane;

stopping the introduction of gas into said waste water inlet; introducing compressed gas into said permeated water outlet to form a mixture of gas and liquid in said permeate water outlet; and flowing said mixture of gas and liquid in said permeated water outlet through said separation membrane from a permeate side of said separation membrane to a feed side of said separation membrane, to further remove said deposited insoluble granular material from said membrane.

14. The method of claim 13, further comprising the step of monitoring the change in flow rate of water in said permeated water outlet and controlling both of said introduction of compressed gas into said waste water inlet and said interruption of said flow of water in said permeated water outlet in response to a change in said flow rate.

15. The method of claim 13, further comprising the step of separating a non-aqueous phase from said waste water prior to introducing said compressed gas into said waste water inlet.

* * * * *